April 20, 1937. R. F. PEO 2,077,583
DEFLECTOR FOR AUTOMOTIVE VEHICLES
Filed May 18, 1935 2 Sheets-Sheet 1
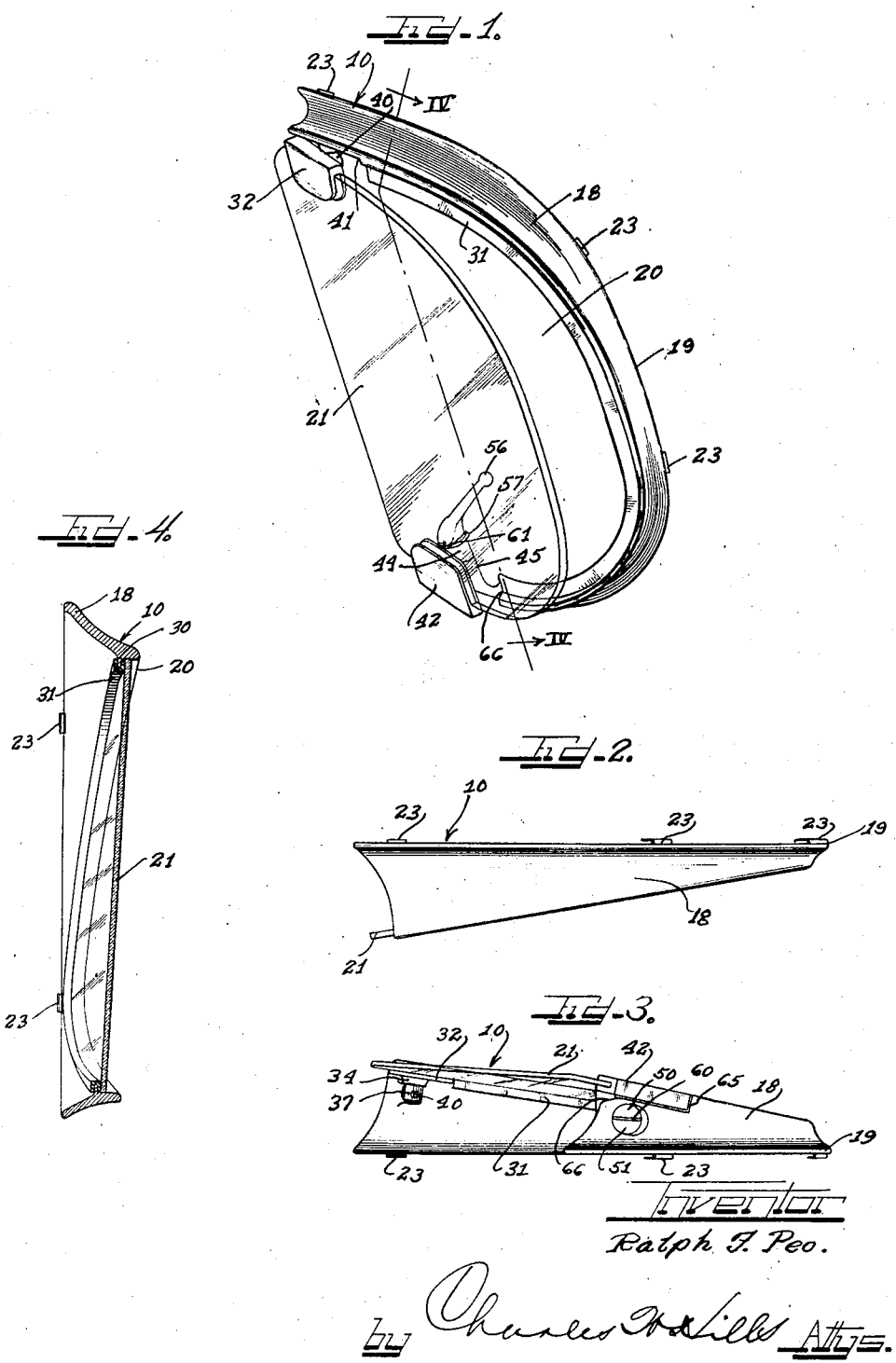
Inventor
Ralph F. Peo.
by Charles W. Wills Attys.

April 20, 1937. R. F. PEO 2,077,583
DEFLECTOR FOR AUTOMOTIVE VEHICLES
Filed May 18, 1935   2 Sheets—Sheet 2
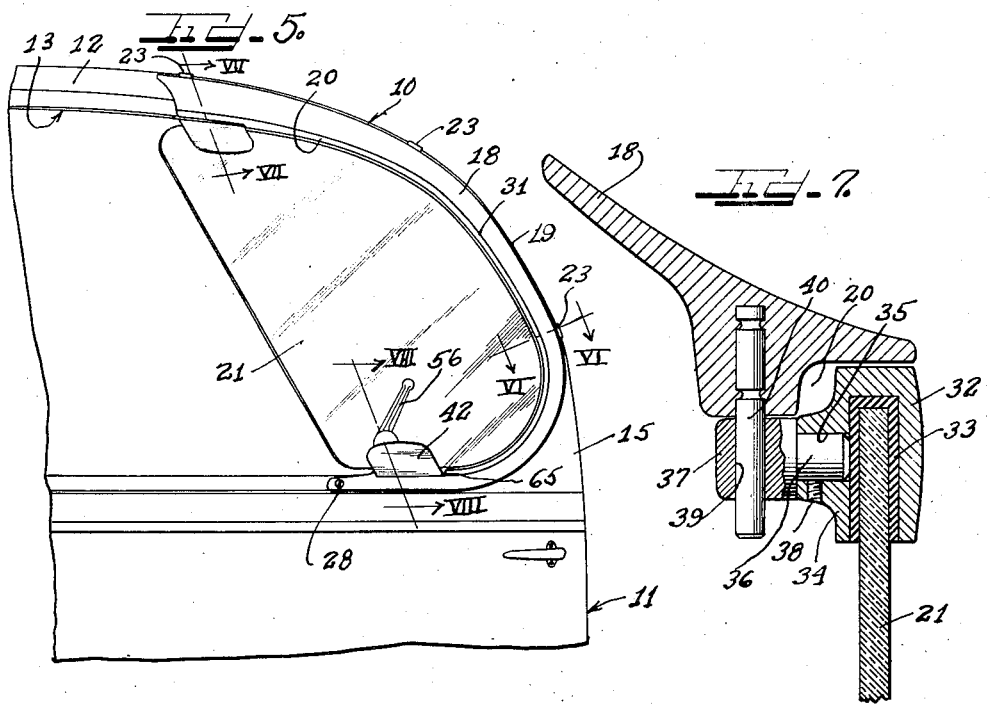
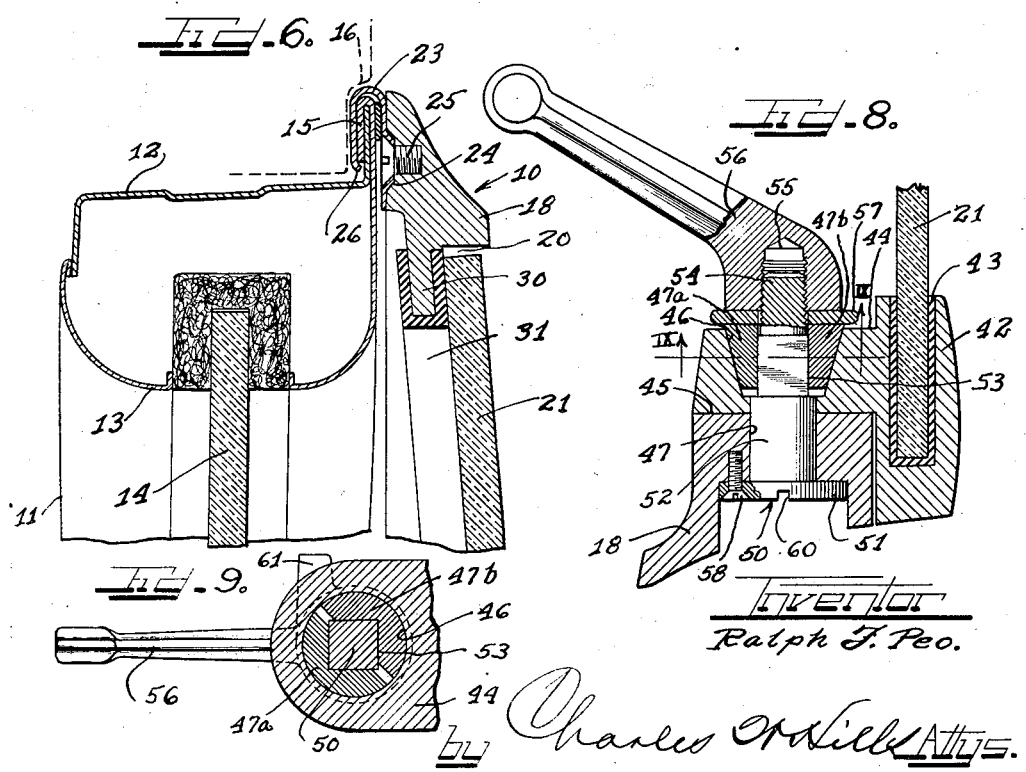

Patented Apr. 20, 1937

2,077,583

UNITED STATES PATENT OFFICE 2,077,583

DEFLECTOR FOR AUTOMOTIVE VEHICLES

Ralph F. Peo, Buffalo, N. Y., assignor to Houde Engineering Corporation, Buffalo, N. Y., a corporaton of New York Application May 18, 1935, Serial No. 22,224

12 Claims. (Cl. 296—84)

This invention relates to a deflector for automotive vehicles, and more particularly to a window wing adapted to be applied readily to the side of an automobile.

An object of this invention is to provide an improved deflector for automotive vehicles which can be readily applied to a side of the vehicle so as to become a permanent part of the vehicle, and which is of such construction and configuration as to be in keeping with the external appearance of the vehicle.

Another object of this invention is to provide a window wing which can be attached by means of a single bolt or fastening element to the side of a vehicle and which when thus attached blends with the streamline appointments of the vehicle.

A further object of the invention resides in the provision of improved means for readily attaching a window wing to the side of an automobile.

A still further object of the invention relates to the provision of a window wing for automobiles which has an improved detail construction, and which is better able to withstand the shocks and blows incident to the movement of the vehicle over a roadway or the like.

In accordance with the general features of this invention, there is provided a window wing including a frame having a transverse wedge shape and being longitudinally streamlined, so as to be in keeping with the streamlined appointments of the forward end of the vehicle; the frame being provided with resilient clips whereby it may be snapped or hung on the forward marginal edge of the vehicle door in an aligned position with the door, in which position it may be thereafter secured to the door by suitable means.

A still further feature of the invention relates to the use of the marginal flange of the vehicle door and associated jamb or seat to aid in the positioning and securement of a side wing to the forward end of the door.

Other objects and features of this invention will more fully appear from the following detailed description, taken in connection with the accompanying drawings, which illustrate a single embodiment thereof, and in which:

Figure 1 is a perspective view of my novel deflector illustrating the shield in its open position;

Figure 2 is a plan view of the deflector shown in Figure 1, with the shield in its closed position;

Figure 3 is a bottom view of the deflector shown in Figure 1, with the shield in its closed position;

Figure 4 is a sectional view taken on the line IV—IV of Figure 1 looking in the direction indicated by the arrows, and illustrating how the shield cooperates with its seat when it is in its closed position;

Figure 5 is a side view of the deflector or window wing, illustrating it as being applied to the forward end of a vehicle door;

Figure 6 is an enlarged fragmentary sectional view taken on the line VI—VI of Figure 5 looking downwardly, and showing the manner in which each of the resilient clips used in the securement of the deflector to the door cooperates with a marginal flange of the door and the associated jamb or seat for that door edge;

Figure 7 is an enlarged fragmentary sectional view taken on the line VII—VII of Figure 5, looking in the direction indicated by the arrows;

Figure 8 is an enlarged fragmentary sectional view taken on the line VIII—VIII of Figure 5, looking in the direction indicated by the arrows; and Figure 9 is a horizontal sectional view taken on line IX—IX of Figure 8, looking upwardly, and showing more clearly the construction of the elements of the lower pivotal mounting of the shield.

On the drawings:

The reference character 10 designates generally a deflector embodying the features of this invention, and which is illustrated as being applied to the side of an automobile, or more specifically, to the forward end of a front door 11 (Fig. 5). This door 11 is part of a streamlined automotive vehicle and includes a streamlined frame 12 which defines a window opening 13 in which is disposed the usual glass window pane 14 (Fig. 6).

The door frame 12 comprises a conventional hollow steel sheet fabrication including a turned marginal flange 15, which is adapted to be disposed in close proximity to the conventional door jamb 16 shown in Figure 6.

I propose, in accordance with the features of this invention, to provide a wind deflector of such construction and configuration that it may be connected to the forward edge of the door frame 12 by means adapted to engage over the turned marginal flange 15 of the door frame 12. In accomplishing this objective, I provide the deflector 10 with a curved metallic frame 18, which, as will be noted from Figures 2, 3 and 4, is substantially of a wedge shape, and which, as best shown in Figures 1 and 5, includes portions extending above and below the window opening 13, as well as a connecting portion tapering forward to a relatively fine edge 19 to provide the deflector with a streamline contour in harmony with the streamlined appointments of the vehicle.

This frame 18 (Fig. 1) has a recess or opening 20 for a deflecting shield or element 21; this shield 21 being pivotally connected to the upper and lower portions of the frame 18 in such a manner that the forward end of the shield may be swung outwardly away from the vehicle window 14.

The rear or back side of the frame 18 is provided with a plurality of resilient U-shaped clips 23 by means of which the deflector 10 is adapted to be hung or snapped on the forward edge of the frame 12 of the door 11. I have illustrated three of these clips as being sufficient for the present purpose, but it is of course to be understood that the number of clips employed may be varied to suit the requirements of a particular installation. These clips are identical in construction, and therefore a description of one will suffice for all three. In Figure 6, I have illustrated one of these clips in cross section, and from this illustration it will be noted that the clip has one leg provided with an apertured portion 24 which is adapted to be secured to the rear face or flange of the frame 18 by means of a screw 25 threaded into a countersunk opening in the frame 18.

The other leg of this U-shaped clip 23 has its end turned slightly in a direction towards the back side of the frame 18, as indicated at 26. The two legs of the clip 23 are spaced apart a sufficient distance to enable the clip to be snapped over the peripheral flange 15 of the door frame 12. By providing each of these clips with a turned edge 26, I find that these clips are enabled to have a retained tight fit with the engaged flange 15.

In applying the deflector 10 to the door, the clips are progressively hooked or snapped over the flange 15, so as to properly locate the deflector in an aligned position with the forward edge of the door, as will be evident from Figure 5. After the deflector is in this position, it may be secured in this position by means of a screw 28 threaded through the lower portion of the frame 18 into the frame 12 of the door.

It will of course be appreciated that a sufficient clearance is provided between the door jamb 16 and the door flange 15 to permit the rear legs of the clips 23 to be disposed between the flange and the jamb when the door is in a closed position, as shown in Fig. 6. Thus, when the door is in a closed position, the clips are tightly clamped to the door jamb by the door itself.

An advantage of this constructoin is that the deflector can be readily mounted on the automobile without necessitating the drilling of many holes in the frame of the door or side of the vehicle. That is to say, it is not necessary to align the frame of the deflector with apertures in the door frame in order to secure the deflector to the door frame by means of screws. In the instant application of my invention, after the clips 23 of the frame of the deflector have been hooked over the door flange, the person applying the deflector to the door has only to drill a single hole through the threaded hole for the screw 28. Thus this hole in the frame 18 serves as a guide for the drilling of the hole in the frame 12 of the door. Once this hole is drilled in the door frame and upon the threading of the screw 28 therein, the deflector is permanently attached to the door and becomes such a part thereof that it is movable as a unit with the door.

The opening 20 in the frame 18 is shaped so that it is adapted to be aligned with the forward end of the window opening 13, (Fig. 5). The forward edge of the glass shield 21 is shaped to correspond to the shape of this opening 20.

The frame 18 has an inwardly extending peripheral flange 30 which is covered by a rubber bead 31 having a U-shaped cross section, as will be evident from Figure 6. This rubber bead, together with its supporting flange 30, provides a cushioned seat or abutment for the glass shield 21. It is this abutment or seat which limits the inward movement of the forward end of the deflector 21 (Figs. 1, 4 and 6).

The upper end of the deflector 21 has fitted over it a grooved bracket member 32, in the groove of which is disposed cushioning material, such as rubber or felt, 33, for embracing the sides and end of the deflector 21 (Fig. 7). The portion of the deflector 21 inside of the groove of the bracket 32 may be suitably secured therein, as by cement or the like.

The bracket 32 has an offset boss 34 which is apertured at 35 to accommodate the reduced end 36 of a pivot or bearing member 37. This reduced end 36 is adapted to be secured tightly to the boss 34 by means of a suitable set screw 38 (Fig. 7).

The outer or enlarged end of the pivotal member 37 is apertured at 39 to provide a bore through which a fixed pintle or pin 40 carried by the frame 18 extends. This pin 40 may be secured in any suitable manner to the upper portion of the frame 18. For example, the metal of the frame may be cast around this pin so that it becomes an integral part of the frame, or the pin, if it is so desired, may be threaded into the upper portoin of the frame and locked thereto by means of a set screw.

It should be noted that the upper end of the shield 21 is pivotally mounted on the pin 40 before the lower end of the shield is connected to its pivotal mounting. In doing this all that is necessary is to slide the apertured or bored outer end of the pivotal member 37 over the projecting portion of the pin 40.

In order that the frame 18 may accommodate the bracket member 32, the upper end of the frame is notched at 41, as best shown in Figure 1. This enables the bracket member 32 to be aligned with the frame when the shield is disposed in closed position on its seat 31.

The lower end of the deflector 21 is embraced by a slotted bracket member 42 similar to the bracket member 32. In the slot or groove of member 42 there is disposed a cushioning medium 43 which embraces the portion of the shield 21 in the groove of this member. This portion of the shield may be cemented or otherwise secured to the member 42.

The bracket member 42 has a rearwardly projecting extension 44 of such configuration that it is adapted to seat on a shouldered portion 45 on the lower end of the frame 18.

The projection 44 has a bore 46 adapted to be aligned with a bore 47 in the shouldered portion of the frame. The upper part of the bore 46 is countersunk so as to provide a frusto-conical seat in which is inserted a frusto-conical gland or friction element which comprises two parts, 47a and 47b, as shown in Figure 9.

The bracket portion 44 is adapted to be swivelly connected to the shouldered portion of the frame by means of the swivel bolt 50, which has an external head 51, a round bearing portion 52 for disposition in the bore 47, a square reduced portion 53 for disposition in the square hole in the gland 47, and a threaded end 54 adapted to be screwed into a threaded socket 55 in a handle lever 56. Disposed between the handle 56 and the external end of the gland is a washer 57. Also, in order that the swivel member 50 may be locked in the position to which it is screwed or tightened, the head 51 thereof is provided with an aperture adapted to be aligned with an aperture in the lower portion of the frame so that a set screw 58 can be threaded into the aligned apertures to hold the member 50 against rotation.

In the application of the shield 21 to the frame 18, as pointed out hereinabove, the upper end of the shield is first connected to the upper pivot pin 40. Thereafter the lower end of the shield 21 is moved inwardly so as to bring the aperture 46 of the bracket extension 44 in alignment with the bore 47. The swivel member 50 is then inserted in the aligned bores. Then the two parts 47ᵃ and 47ᵇ of the gland element are inserted in the frusto-conical portion of the bore 46 and about the squared reduced portion 53 of the swivel member 50. The washer 57 is next positioned over the upper or threaded end of the swivel member, and the lever or handle 56 is thereafter applied to the threaded end of the swivel member. However, in order to tighten the parts together, it is necessary to turn the swivel member 50 by inserting the end of a screw driver in the screw driver slot 60. Obviously, by turning the member 50, the lever 56 is caused to be threadedly engaged with the threaded end 54 of the member 50. When these parts are thus connected, the gland 47 provides for a tight frictional cooperation between the swivel pin and the bracket portion 44 when the handle is tightened. This engagement is of such a character as to resist the free turning of the shield on its pivotal axis until the handle is loosened.

The lever or handle 56 is provided with a lug 61, as best shown in Figures 1 and 9, which is adapted to strike an inner surface of the bracket member 42 to prevent the lever from turning into a position into which it would strike the glass shield 21.

From the foregoing description it will be apparent that the glass shield 21 is adapted to pivot or rotate about an axis which passes through the pivot pin 40 and through the swivel bolt or screw 50. The inward or closing movement of the shield 21 is limited by the shield striking the abutment afforded by the rubber seat 31. The outward or opening movement of the shield is limited by the bracket member 42 coming into engagement with the rounded shoulder 66 of the bottom portion of the frame 18, as best shown in Figure 3. In this illustration, it will also be noted that the bottom portion of the frame 18 is cut out at 65 to accommodate the bracket member 42. Upon the shield being swung to its open position, the forward edge of the shield moves out of engagement with the rubber seat, and the bracket member 42 also moves out of the notch or slot 65 in the bottom portion of the frame. The forward edge of the shield can be continued to be moved away from the seat 31 until a rear surface of the bracket 42 strikes the rounded abutment 66 formed in the lower portion of the frame.

The shield is prevented from being vibrated or jarred out of the position to which it is adjusted by reason of the fact that the gland 47 provides a frictional resistance to the swinging of the shield about its axis. This resistance can be adjusted by turning the handle 56 so that such resistance is sufficient to preclude the shield from being jarred out of its adjusted position. That is to say, the shield may be locked in an adjusted position or may be freed for movement by the manual manipulation of the handle 56 which is disposed in a readily accessible position. The details of this gland and handle structure constitute parts of another invention which is to be covered in a separate application.

As far as I know, I am the first in the deflector art to provide a deflector which can be hung or snapped into a proper aligned position with a vehicle window opening without necessitating the use of any fastening means such as bolts, clamps, or the like. After the deflector has been hung or snapped in this aligned position, a single fastening element 28, as pointed out hereinabove, may be employed to fasten the deflector permanently to the window frame.

Now, I desire it understood that while I have illustrated and described in detail a preferred embodiment of this invention, the invention is not to be thus limited, but only insofar as defined by the scope and spirit of the appended claims.

I claim as my invention:

1. In a deflector for an automotive vehicle, a frame, a shield carried thereby, and a plurality of resilient clips carried by said frame for mounting the deflector on the vehicle, said clips being secured in spaced relation to a rear side of said frame each of said clips including a free resilient portion disposed to be snapped into retaining engagement with a part of the vehicle by the mere act of pressing that portion against said part.

2. In a deflector for an automotive vehicle, a frame, a shield carried thereby, and a plurality of spaced clips carried by said frame for mounting the deflector on the vehicle, said clips each comprising a U-shaped element having one leg secured to the frame and having its other leg spaced from the frame to engage over a portion of the vehicle.

3. In a deflector for an automotive vehicle, a frame, a shield carried thereby, and a plurality of spaced clips carried by said frame for mounting the deflector on the vehicle, said frame being longitudinally curved to conform to the shape of an adjoining part of the vehicle to which the deflector is to be applied, and said clips being secured at spaced intervals to the rear side of said curved frame and being of such construction as to enable the frame to be snapped on a projecting portion of the vehicle each of said clips including a free projection disposed to be snapped into retaining engagement with said vehicle portion by the mere act of pressing said free projection against said vehicle portion.

4. In a deflector for an automotive vehicle, a frame, a shield carried thereby, and a plurality of resilient clips carried by said frame for mounting the deflector on the vehicle, said frame being longitudinally curved to conform to the shape of an adjoining part of the vehicle to which the deflector is to be applied, and said clips being secured at spaced intervals to the rear side of said curved frame, so as to enable the frame to be hung on a projecting portion of the vehicle, each of said clips being of a U-shaped cross section with the open end of the U facing downwardly, and with one leg secured to a rear portion of the frame, said clips being of such construction and arrangement as to provide for the snapping of the frame into a retained or aligned position with respect to a window opening.

5. In a deflector for an automotive vehicle, a frame, a shield carried thereby, a plurality of resilient clips carried by said frame for mounting the deflector on the vehicle, and a single fastening element for securing the frame to the vehicle after the deflector has been mounted on the vehicle by means of said clips, said clips being of such construction and arrangement as to provide for the snapping of the frame in a retained or aligned position with respect to a window opening.

6. In a deflector for an automotive vehicle, a frame, a shield carried thereby, and a plurality of spaced clips carried by said frame for mounting the deflector on the vehicle, said frame being of substantially a wedge shape in its entirety, and tapering toward the rear side of the frame and toward the front of the vehicle to a relatively fine edge to produce a streamline effect, said clips being secured to the rear side of said frame so as to project outwardly from said fine edge.

7. In a deflector for an automotive vehicle, a frame, a shield carried thereby, and a plurality of spaced clips carried by said frame for mounting the deflector on the vehicle, said frame being wedge-shaped substantially in its entirety, and including portions extending above and below the window opening, and a connecting portion which portions taper outwardly to a relatively fine edge to produce a streamline effect, said clips being secured to said frame at spaced intervals along the rear side of the upper and connecting portion of the frame, said lower portion of the frame being provided with means for enabling it to be secured to the vehicle after the deflector has been mounted by means of said clips on the vehicle.

8. The combination of an automotive vehicle including a window opening defined by a frame with a deflector including a frame, a shield carried thereby, and resilient means of such arrangement and construction as to enable the deflector frame to be snapped into an aligned retained engagement with a portion of the vehicle window frame, said resilient means including a lateral projection disposed to be snapped into retaining engagement with said window frame portion by the mere act of pressing the lateral projection against said portion.

9. The combination of an automotive vehicle including a window opening defined by a frame with a deflector including a frame, a shield carried thereby, and resilient means of such arrangement and construction as to enable the deflector frame to be snapped into an aligned retained engagement with a portion of the vehicle window frame, said means including a plurality of spaced resilient clips carried by the deflector frame and each of said clamps including a resilient projection disposed to be snapped into retaining engagement with said window frame portion by the mere act of pressing said resilient projection against said portion.

10. The combination of an automotive vehicle including a window opening defined by a frame with a deflector including a frame, a shield carried thereby, and clip-like means of such arrangement and construction as to enable the deflector frame to be hung on a portion of the vehicle window frame in aligned retained engagement therewith preliminary to the fastening of the frame in place, said clip-like means including a resilient extension disposed to be snapped into retaining engagement with said window frame portion by the mere act of pressing that extension against said portion.

11. The combination of an automotive vehicle including a window opening defined by a frame with a deflector including a frame, a shield carried thereby, and clip-like means for enabling the deflector frame to be hung on a portion of the vehicle window frame in aligned retained engagement therewith, said means including a resilient clip formed to be snapped over said frame portion to retain the frame in aligned position with respect to the window opening, said resilient clip including a snap on part movable into retaining engagement with said window frame portion by the mere act of pressing said part against said portion.

12. The combination of an automotive vehicle including a window opening defined by a frame with a deflector including a frame, a shield carried thereby, and clip-like means for enabling the deflector frame to be hung on a portion of the vehicle window frame in aligned retained engagement therewith, said means including a resilient clip formed to be snapped over said frame portion and having a U shape with one of its legs attached to the deflector frame and its other leg spaced therefrom to retain the frame in aligned position with respect to the window opening.

RALPH F. PEO.